M. J. DIKEMAN.
SURVEYING INSTRUMENT.
APPLICATION FILED NOV. 15, 1909.
958,794.
Patented May 24, 1910.
3 SHEETS—SHEET 1.
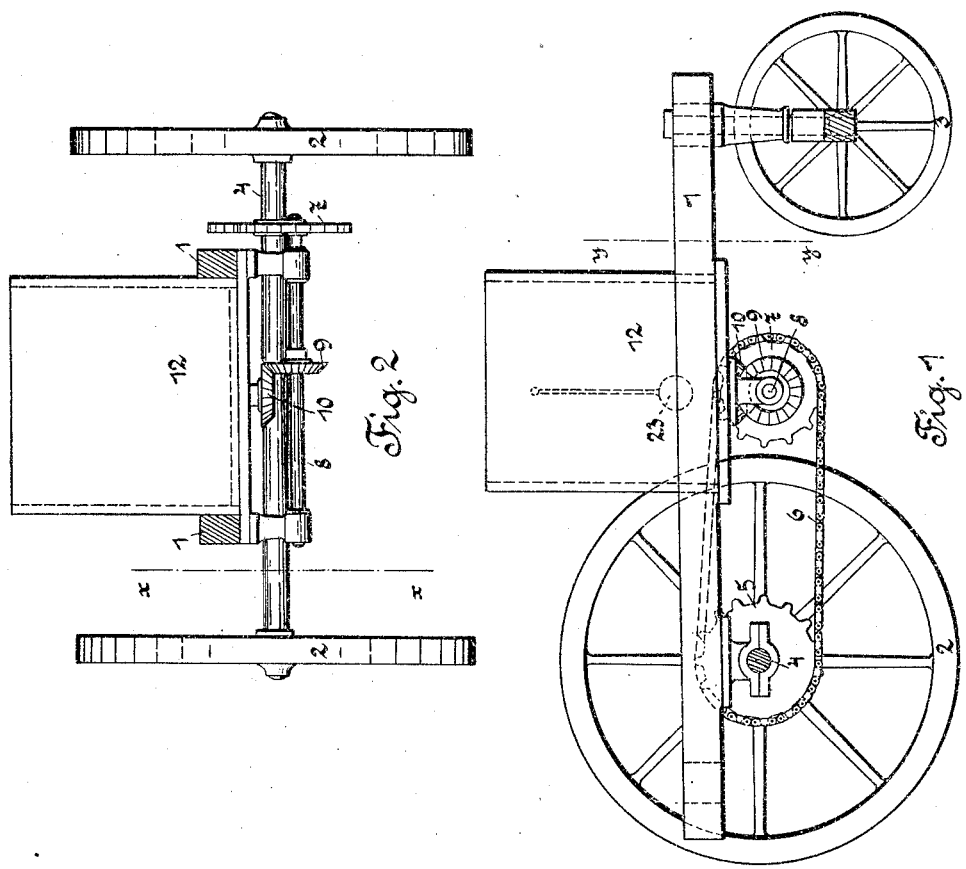
Witnesses:
Carl R. Aberle
B. G. Richards
Inventor:
Myron J. Dikeman
By Joshua R. H. Potts
His Attorney.

M. J. DIKEMAN.
SURVEYING INSTRUMENT.
APPLICATION FILED NOV. 15, 1909.

958,794.

Patented May 24, 1910.

3 SHEETS—SHEET 2.

Witnesses:
Carl R. Aberle
B. G. Richards

Inventor:
Myron J. Dikeman
by Joshua R. H. Potts
His Attorney.

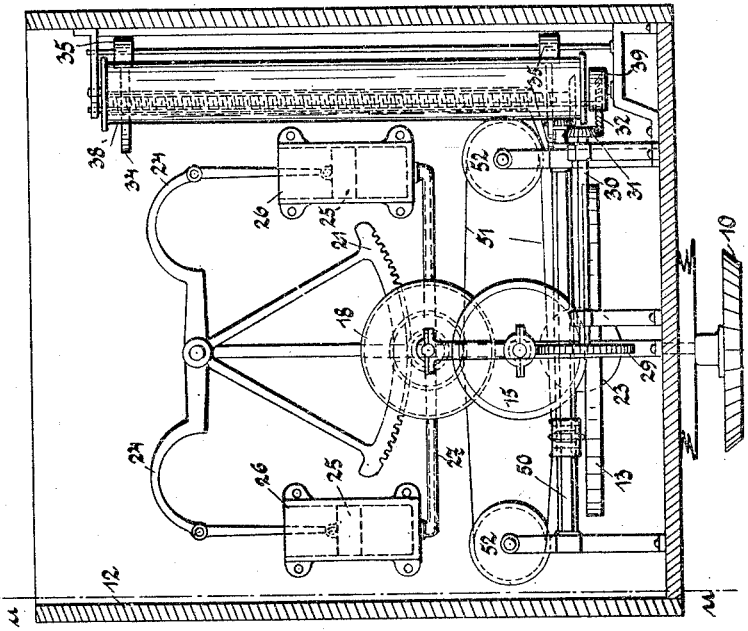

UNITED STATES PATENT OFFICE.

MYRON J. DIKEMAN, OF JOLIET, ILLINOIS.

SURVEYING INSTRUMENT.

958,794.  Specification of Letters Patent.  Patented May 24, 1910.

Application filed November 15, 1909. Serial No. 528,189.

*To all whom it may concern:*

Be it known that I, MYRON J. DIKEMAN, a citizen of the United States, residing at Joliet, county of Will, and State of Illinois, have invented certain new and useful Improvements in Surveying Instruments, of which the following is a specification.

My invention relates to improvements in surveying instruments and has for its object the production of a surveying instrument which will automatically delineate the profile of the ground over which it is passed, thereby accurately recording the variations in level of said ground.

A further object of the invention is to provide such an instrument which shall be of simple construction and accurate in operation.

My invention consists in the combination and arrangement of parts hereinafter described and claimed.

Figure 3:
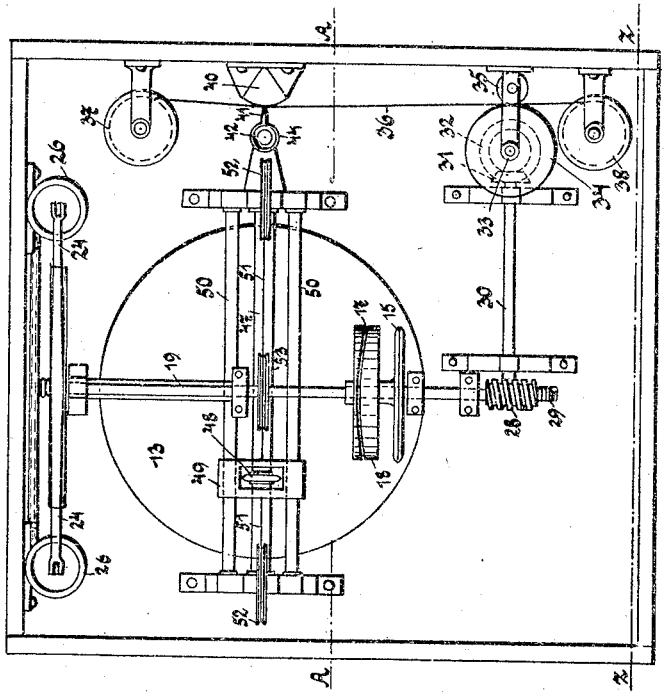
Figure 4:
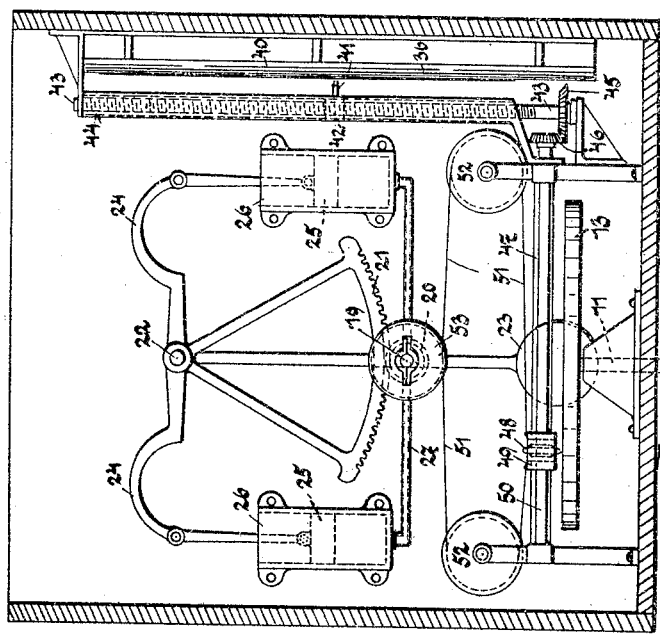

My invention will be best understood by reference to the accompanying drawings forming a part of this specification, and in which, Figure 1 is a longitudinal section of an instrument embodying my invention, the said section being taken on the line $x$—$x$ of Fig. 2, Fig. 2, a section on line $y$—$y$ of Fig. 1, Fig. 3, an enlarged top plan view of the recording mechanism of the instrument, Fig. 4, a section on line A—A of Fig. 3, Fig. 5, a section on line Z—Z of Fig. 3, and Fig. 6, a section on line U—U of Fig. 5.

The preferred form of construction as illustrated in the drawings comprises a suitable wagon frame 1 mounted upon suitable traction wheels 2 and 3. Wheels 2 are fixed to an axle 4 rotatably mounted in said frame. Axle 4 carries a sprocket wheel 5 connected by means of a sprocket chain 6 with a sprocket wheel 7 on shaft 8 which is rotatably mounted on the under side of frame 1. Shaft 8 carries a beveled gear 9 meshing with a beveled gear 10 which is carried by the lower end of a vertical shaft 11 extending upwardly into a box or casing 12 suitably mounted upon frame 1. At its upper end shaft 11 carries a primary friction disk 13. A shaft 14 is rotatably mounted in casing 12 radially of disk 13 and carries a secondary friction disk 15 splined thereto. Disk 15 carries a small cam wheel 16 engaging a cam path 17 in a cam disk 18 mounted upon a shaft 19 as shown. At one end shaft 19 carries a gear 20 meshing with a segmental gear 21 pivotally mounted on trunnion 22 and rigidly connected with pendulum 23. Rocker arms 24 rigidly connected with pendulum 23 and segmental gear 21 carry pistons 25 operating in cylinders 26. Cylinders 26 are connected at their lower ends by means of a pipe 27 which together with the lower portions of said cylinders is filled with oil or other suitable liquid. By this construction it will be seen that as the wagon travels over the ground the disk 13 will be caused to rotate proportional to the rotations of wheel 2, the latter rotations of course being controlled by the longitudinal distance traveled by the wagon. The rotations of disk 13 are communicated to disk 15. And thus, when the wagon travels over level ground, the speed of rotation of disk 15 will be proportional to the longitudinal and horizontal travel of the wagon. When, however, the wagon travels up or down an incline the pendulum 23 will be shifted by the action of gravity relatively to the gear 20 thus causing shaft 19 to rotate in one direction or the other depending upon the direction of said inclination. This rotation of shaft 19 is communicated to cam disk 18 with the effect that cam slot 17 operates to draw disk 15 inwardly toward the center of disk 13 thus diminishing the speed of rotation of disk 15 proportional to the degree of inclination traversed by the wagon no matter whether said inclination be upwardly or downwardly. Thus it will be seen that disk 15 will be caused to rotate at a speed proportional to the horizontal distance traveled by the wheels 2 irrespective of the degree of inclination up or down which the wagon travels.

At its outer end shaft 14 carries a worm gear 28 meshing with a worm wheel 29 carried by a shaft 30. At one end shaft 30 carries a beveled gear 31 meshing with a beveled gear 32 on the lower end of a vertical shaft 33. Shaft 33 carries disks 34 coöperating with similar disks 35 to engage a traveling record sheet 36 as shown in Fig. 3. Record sheet 36 is wound upon rollers 37 and 38 and roller 38 is provided with a spiral spring 39 adapted to cause roller 38 to wind record sheet 36 thereon. Spring 39 may be wound up to effect this function by any of the well known mechanisms for the purpose. Record sheet 36 passes over a vertically disposed support or table 40 in contact with marking pencil 41. The marking pencil 41 is carried by a sleeve 42 threaded upon the threaded shaft 43 and held from rotation on said shaft by means of the slotted tube 44. By this construction it will be seen that the rotations of disk 15 will be communicated to disks 34 thus permitting a longitudinal travel of record sheet 36 proportional to the horizontal travel of the wagon, and that marking pencil 41 will draw a line upon said record sheet during this travel.

At its lower end shaft 43 carries a beveled gear 45 meshing with a beveled gear 46 on the end of a shaft 47 arranged diametrically over disk 13. Shaft 47 carries a secondary friction disk 48 splined thereto and rotatably mounted in a frame 49 sliding on guide rods 50 at either side of shaft 47. A flexible cable 51 is secured to either side of frame 49 passes over pulleys 52 near either end of shaft 47 and is wrapped upon a drum 53 carried by shaft 19. The connections between the parts are so made that when pendulum 23 hangs vertically with reference to disk 13, or in other words when the wagon is traveling over level ground, the friction disk 48 is held by cable 51 in the center of disk 13, and will thus remain stationary. When the wagon travels up or down an inclination the pendulum 23 will swing one way or the other relatively to disk 13 thus causing rotation of drum 53 and consequent travel of disk 48 outwardly on disk 13 in a direction corresponding to the swing of said pendulum. The greater the inclination the greater the distance disk 48 will be shifted from the center of disk 13 and consequently the greater will be the speed of rotation of disk 48 imparted by disk 13, and the direction of rotation of disk 48 will depend upon the direction of swing of pendulum 23, or in other words whether the wagon is going up an inclination or down one. Thus it is apparent that when the wagon travels over level ground the disk 48 will not be rotated but that when the wagon travels over an inclination the disk 48 will be rotated at a speed proportional to said inclination and in a direction depending upon the direction of said inclination. The rotations of disk 48 are communicated to shaft 43 and thus cause pencil 41 to travel upwardly on record sheet 36 when the wagon is traveling up an inclination and downwardly on sheet 36 when the wagon is traveling down an inclination, and the speed of travel of said pencil will be proportional to the degree of inclination over which the wagon travels. Thus it will be seen that when the wagon travels over level ground the pencil 41 will draw a straight horizontal line upon record sheet 36 but when the wagon travels up or down an inclination the line drawn upon record sheet 36 will be correspondingly inclined. Thus the profile of the ground over which the wagon travels will be accurately delineated and if record sheet 36 be provided with a suitable scale the elevations or "levels" of the various points traversed by the wagon may be readily compared with those of the starting point, which if known or assumed will at once give the true elevations or levels of said respective points. Thus it will be seen that an accurate profile of the ground will be delineated by the mere passage of the wagon thereover and that the record sheet thus made may be readily employed to give the actual or relative elevations or "levels" of the respective points traversed.

While I have illustrated and described the preferred form of construction for carrying my invention into effect this is capable of variation or modification without departing from the spirit of the invention. I, therefore, do not wish to be limited to the exact details of construction set forth but desire to avail myself of such variations and modifications as come within the scope of the appended claims.

Having described my invention what I claim as new and desire to secure by Letters Patent is:—

1. In a surveying instrument, the combination with a suitable vehicle, of a record sheet mounted to travel longitudinally; a wheel on said vehicle traveling on the ground; a primary friction disk; a driving connection between said disk and wheel; a shaft arranged radially of said disk; a secondary friction disk splined to said radial shaft; an operative connection between said radial shaft and said record sheet; a shaft arranged diametrically of said primary disk; a secondary friction disk splined to said diametric shaft; a marker adapted to trace a line on said record sheet; means for causing travel of said marker transversely of said record sheet; an operative connection between said diametric shaft and said marker travel causing means; a pendulum; and connections between said pendulum and said secondary disk, whereby when the vehicle travels over level ground the marker controlling disk is held at the center of said primary disk and departure from level travel causes movement of said marker disk outwardly and said record sheet disk inwardly, relatively to said primary disk, substantially as described.

2. In a surveying instrument, the combination with a suitable vehicle, of a pair of vertically disposed rollers; a record sheet adapted to travel from one of said rollers to the other; a wheel on said vehicle traveling on the ground; a horizontal primary-friction disk; a driving connection between said disk and wheel; a shaft arranged radially of said disk; a secondary friction disk splined to said radial shaft; a cam wheel carried by said friction disk; an operative connection between said radial shaft and said record sheet rollers; a shaft arranged diametrically of said primary friction disk; a marker adapted to trace a line on said record sheet; means for causing travel of said marker transversely of said record sheet; an operative connection between said diametric shaft and said marker travel causing means; a secondary friction disk splined to said diametric shaft; a pendulum; a shaft operated by said pendulum; a cam disk carried by said pendulum shaft and provided with a cam path engaging said cam wheel, the said cam path being so shaped as to cause inward feed of the corresponding friction disk upon movement of said cam disk relatively to said cam wheel in either direction; a drum carried by said pendulum shaft; pulleys arranged near the ends of said diametric shaft, and a cable wrapped upon said drum, passing over said pulleys and connected at either side of the secondary disk on said diametric shaft, substantially as described.

3. In a surveying instrument, the combination with a suitable vehicle, of a pair of vertically disposed rollers, a record sheet adapted to travel from one of said rollers to the other; a wheel on said vehicle traveling on the ground; a horizontal primary friction disk; a driving connection between said disk and wheel; a shaft arranged radially of said disk; a secondary friction disk splined to said radial shaft; a cam wheel carried by said friction disk; an operative connection between said radial shaft and said record sheet rollers; a shaft arranged diametrically of said primary friction disk; a marker adapted to trace a line on said record sheet; means for causing travel of said marker transversely of said record sheet; an operative connection between said diametric shaft and said marker travel causing means; a secondary friction disk splined to said diametric shaft; a pendulum; a segmental gear carried by said pendulum; a pendulum shaft; a gear on said pendulum shaft meshing with said segmental gear; rocker arms carried by said pendulum, pistons connected with the ends of said rocker arms; connected cylinders containing said pistons; a cam disk carried by said pendulum shaft and provided with a cam path engaging said cam wheel, the said cam path being so shaped as to cause inward feed of the corresponding friction disk upon movement of said cam disk relatively to said cam wheel in either direction; a drum carried by said pendulum shaft; pulleys arranged near the ends of said diametric shaft; and a cable wrapped upon said drum, passing over said pulleys and connected at either side of the secondary disk on said diametric shaft, substantially as described.

In testimony whereof I have signed my name to this specification in the presence of two subscribing witnesses.

MYRON J. DIKEMAN.

Witnesses:
MARTIN LUNDQUIST,
HENRY ODENTHAL, Jr.